United States Patent [19]
Seiler

[11] Patent Number: 6,097,160
[45] Date of Patent: Aug. 1, 2000

[54] DEVICE AND PROCESS FOR OPERATING A GAS DISCHARGE LAMP HAVING A RESONANT CIRCUIT THAT CONTAINS THE GAS DISCHARGE LAMP

[75] Inventor: Hartmut Seiler, Baden-Baden, Germany

[73] Assignee: Robert Bosch GmbH, Stuttgart, Germany

[21] Appl. No.: 08/930,621

[22] PCT Filed: Mar. 8, 1996

[86] PCT No.: PCT/DE96/00421

§ 371 Date: Oct. 7, 1997

§ 102(e) Date: Oct. 7, 1997

[87] PCT Pub. No.: WO96/33596

PCT Pub. Date: Oct. 24, 1996

[30] Foreign Application Priority Data

Apr. 18, 1995 [DE] Germany ............................ 195 13 557

[51] Int. Cl.[7] .................................................. H05B 37/02
[52] U.S. Cl. ................ 315/209 R; 315/224; 315/276; 315/291; 315/DIG. 5
[58] Field of Search .............................. 315/247, 209 R, 315/DIG. 5, DIG. 7, 225, 307, 291, 224, 248, 244, 276

[56] References Cited

U.S. PATENT DOCUMENTS 5,008,597  4/1991  Zuchtriegel ............................ 315/224

FOREIGN PATENT DOCUMENTS 3608362  9/1987  Germany.

OTHER PUBLICATIONS

Encyclopedia of Electronics edited by Stan Gibilisco, TAB Professional and Reference Books, 3 pages, 1985.

*Primary Examiner*—David Vu
*Assistant Examiner*—Wilson Lee
*Attorney, Agent, or Firm*—Venable; George Spencer; Norman Kunitz

[57] ABSTRACT

The invention proposes an apparatus and method for operating a gas discharge lamp (10) contained in a resonant circuit (L1, C1). A series connection is provided that is connected to a voltage source (14) and comprises a first semiconductor switch (12), an inductive element (L2) and a second semiconductor switch (13), with the resonant circuit (L1, C1) being connected at a connecting point (15) between the inductive element and the second semiconductor switch (13). If the gas discharge lamp (10) is in the non-ignited state, the first semiconductor switch (12) is continuously switched on and the second semiconductor switch (13) is at least approximately switched with the resonant frequency of the resonant circuit (L1, C1). In the ignited state of the gas discharge lamp (10), the two semiconductor switches (12, 13) are switched alternatingly and in push-pull operation with the operating frequency for operating the gas discharge lamp (10) in continuous operation.

20 Claims, 2 Drawing Sheets

DEVICE AND PROCESS FOR OPERATING A GAS DISCHARGE LAMP HAVING A RESONANT CIRCUIT THAT CONTAINS THE GAS DISCHARGE LAMP

STATE OF THE TECHNOLOGY

The invention is based on an apparatus and a method for operating a gas discharge lamp of the type having a resonant circuit that contains the gas discharge lamp. DE-A 37 15 162.2 discloses a circuit arrangement for operating a gas discharge lamp that provides an AC voltage of suitable amplitude and frequency for operating the gas discharge lamp. The gas discharge lamp is contained in a resonant circuit that is excited with the resonant frequency for igniting the gas discharge lamp. After lamp ignition, the known circuit arrangement reduces the frequency of the AC voltage, with respect to the resonant frequency, to lower values for operating the gas discharge lamp in continuous operation.

It is the object of the invention to provide a circuit and a method for operating a gas discharge lamp which, using simple means, permit reliable ignition and operation of the gas discharge lamp in continuous operation.

SUMMARY AND ADVANTAGES OF THE INVENTION

The above object generally is achieved according to the present invention by an apparatus for operating a gas discharge lamp, having a resonant circuit that contains the gas discharge lamp, a series circuit connected to a voltage source and including a first semiconductor switch, an inductive element and a second semiconductor switch, and wherein the resonant circuit is connected at a connecting point between the inductive element and the second semiconductor switch.

The circuit arrangement of the invention has the advantage of providing a sufficiently-high ignition voltage for igniting a gas discharge lamp, particularly a high-pressure gas discharge lamp, and a highly-effective operating voltage in the subsequent operation of the gas discharge lamp.

In accordance with the invention, it is provided that the gas discharge lamp is contained in a resonant circuit. Moreover, a series connection is provided that includes a first semiconductor switch, a first inductive element and a second semiconductor switch, with the resonant circuit being connected at the connection of the first inductive element to the second semiconductor switch.

The method of the invention, which is preferably used with the described structure, provides that the first semiconductor switch is continuously switched on prior to lamp ignition, and the second semiconductor switch is at least approximately switched with the resonant frequency of the resonant circuit that contains the gas discharge lamp in order to excite the resonant circuit. Depending on the operating frequency, only the first inductive element of the resonant circuit remains significant following ignition of the gas discharge lamp, and the two semiconductor switches are alternatingly switched with an operating frequency for operating the gas discharge lamp in continuous operation.

Advantageous modifications and embodiments of the apparatus and method of the invention are disclosed.

An advantageous embodiment involves the configuration of the resonant circuit as a series connection of a second inductive element having a capacitor that is connected in parallel to the gas discharge lamp. The configuration as a resonant circuit according to the invention has the advantage that the capacitor connected in parallel to the gas discharge lamp is ineffective following ignition of the gas discharge lamp.

An advantageous modification of the resonant circuit provides that the resonant circuit is connected to a circuit ground, for example, by a further capacitor. The further capacitor leads to a partition of DC-voltage components at the gas discharge lamp. With this measure, the circuit arrangement of the invention can be supplied with energy by a voltage source that only provides an output voltage.

An advantageous modification provides the use of an ignition detector that detects the ignition of the gas discharge lamp and triggers switching processes in an actuation circuit of the semiconductor switches. The use of the ignition detector, which preferably evaluates the voltage occurring at the gas discharge lamp, permits a rapid transition from the ignition phase of the gas discharge lamp to the subsequent continuous operation. The rapid recognition of lamp ignition assures a supply of energy into the lamp, thus preventing the light arc from being extinguished after the ignition process.

Further advantageous measures involve the actuation of the second semiconductor switch during the ignition process. An ignition-clock generator provided in accordance with the invention, which switches the second semiconductor switch with the resonant frequency of the resonant circuit, preferably includes a frequency modulator that permits a variation of the clock frequency provided by the ignition-clock generator for attaining the best possible matching with the resonant frequency of the resonant circuit.

An advantageous measure provides that the ignition-clock generator is synchronized with the current flowing in the resonant circuit. It is particularly possible to synchronize the ignition-clock generator with the current zero crossing in the resonant circuit.

Another advantageous embodiment provides the use of an ignition-packet clock generator, which effects the excitement of the resonant circuit by means of pulse packets. The intermittent interruption of the ignition process in an unsuccessful ignition attempt reduces the stress of the components contained in the resonant circuit, especially that of the capacitor switched in parallel to the gas discharge lamp. A modification provides that the number of ignition packets is detected by a counter which, after each increase in the counter state, lowers or raises the frequency of the ignition-clock generator. This lowering or raising is preferably effected as a function of the voltage occurring at the gas discharge lamp. This measure ensures the attainment of the resonant frequency, and reliable ignition of the gas discharge lamp.

An advantageous modification provides that the DC-voltage source, to which the series connection comprising the two semiconductor switches is connected, is configured as a DC/DC converter that increases the operating voltage preferably provided by a battery to a level sufficient for operating the gas discharge lamp in continuous operation. A variation of the voltage offers the simple option of controlling the power of the gas discharge lamp.

The apparatus and method of the invention are especially well-suited for operating gas discharge lamps, preferably high-pressure gas discharge lamps configured as headlight lamps in a motor vehicle. The use of gas discharge lamps as headlight lamps in a motor vehicle leads to a stress of the energy-supply circuit due to high ambient temperatures. To keep inherent heating low, therefore, the circuit arrangement of the invention must have a high degree of effectiveness. Additionally, a high, maintenance-free operating reliability under harsh environmental conditions must be assured.

Further advantageous modifications and embodiments of the apparatus and method of the invention ensue from further, dependent claims and the following description.

DETAILED DESCRIPTION OF THE PREFFERED EMBODIMENT

Figure 1:
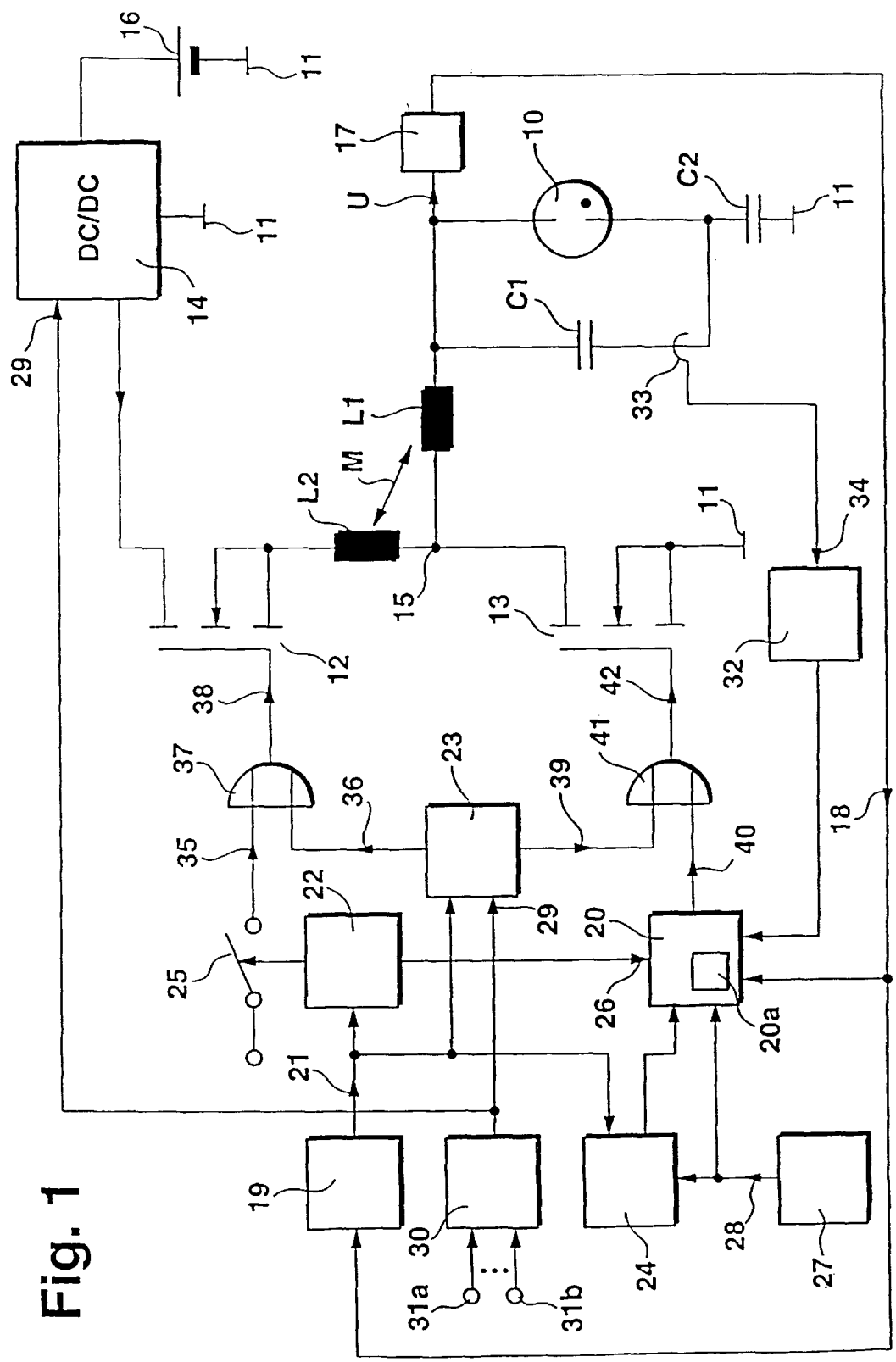
FIG. 1 shows a circuit diagram of an apparatus according to the invention for operating a gas discharge lamp.

FIG. 1 shows a gas discharge lamp 10 that is contained in a resonant circuit. A first inductive element L1, hereinafter referred to as first coil L1, and a first capacitor C1 that is connected in parallel to the gas discharge lamp 10 form the resonant circuit. The gas discharge lamp 10 is connected by a second capacitor C2 to a circuit ground 11, hereinafter referred to as ground 11, and by the first coil L1 to a series connection. The series connection includes a first semiconductor switch 12, a second inductive element L2, hereinafter called second coil L2, and a second semiconductor switch 13. The second coil L2 is magnetically coupled to the first coil L1 by the coupling M shown as an arrow. The first semiconductor switch 12 is connected on the one hand to a voltage source 14 and, on the other hand, to the second coil L2. The first coil L1 of the resonant circuit is connected to a connection 15 of the second coil L2 to the second semiconductor switch 13, which is connected to ground 11. The voltage source 14, which is connected to ground 11, draws energy from a battery 16.

A voltage U occurring at the gas discharge lamp 10 is detected by a voltage sensor 17, which transmits a voltage signal 18 to an ignition detector 19 and an ignition-clock generator 20.

The ignition detector 19 transmits a switching signal 21 to a reversing switch 22, an operation-clock generator 23 and a counter 24. The reversing switch 22 actuates a switch 25 and transmits a switching signal 26 to the ignition-clock generator 20, which includes a frequency modulator 20a. The ignition-clock generator 20 further receives an output signal 28 that is provided by an ignition-packet clock generator 27 and is also supplied to the counter 24.

The operation-clock generator 23 is influenced not only by the reversing signal 21, but also by a control signal 29 that is generated by a power preset 30 as a function of a plurality of input signals 31a . . . 31b. The control signal is also supplied to the voltage source 14.

A further input signal of the ignition-clock generator 20 is provided by a current zero-crossing detector 32, which detects a current signal 34 that is detected by a current sensor 33 and occurs in the resonant circuit L1, C1.

The switch 25 provides a first partial actuation signal 35, and the operation-clock generator 23 provides a second partial actuation signal 36, for the first semiconductor switch 12. The two partial actuation signals 35, 36 pass through a first OR link 37, which transmits a first actuation signal 38 to the first semiconductor switch 12.

The operation-clock generator 23 provides a first partial actuation signal 39, and the ignition-clock generator 20 provides a second partial actuation signal 40, for the second semiconductor switch 13. From the two partial actuation signals 39, 40 for the second semiconductor switch 13, a second OR link 41 forms a second actuation signal 42 for the second semiconductor switch 13.

Figure 2:
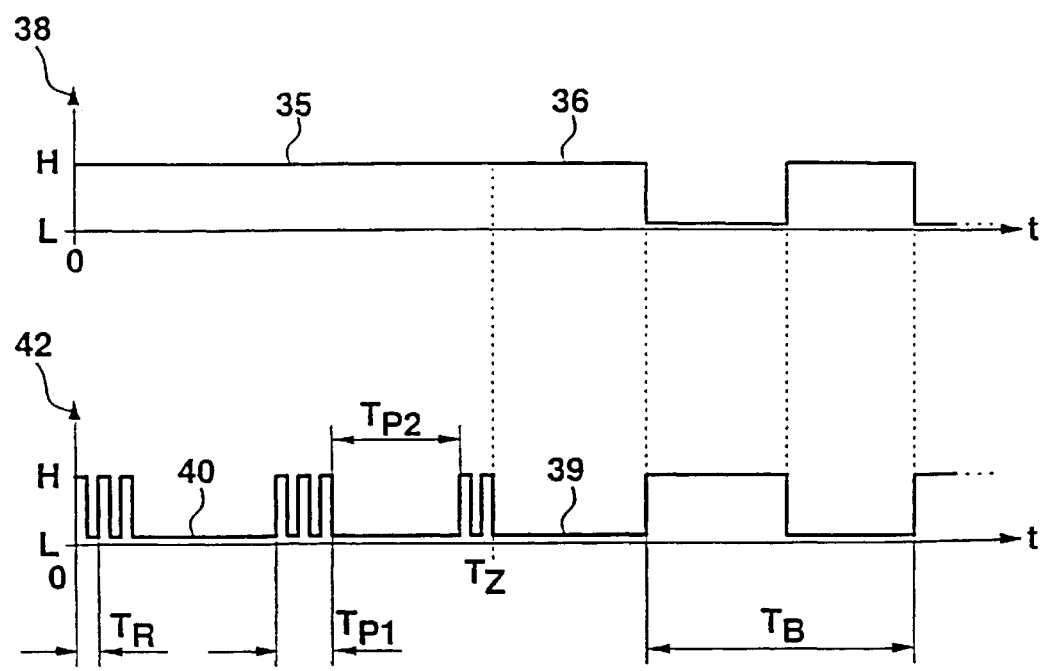
FIG. 2 shows two partial images of signal courses, as a function of time, that occur in the apparatus of the invention.

The function of the apparatus and method of the invention is described in detail in conjunction with the circuit diagram shown in FIG. 1 and the signal courses shown in FIG. 2 as a function of time t:

After the apparatus of the invention has been started, the gas discharge lamp 10 is in the off state. The gas discharge lamp 10 is essentially ignited by the overvoltage at the gas discharge lamp 10, which is attained with the resonant circuit L1, C1 containing the first coil L1 and the first capacitor C1. The ignition detector 19 determines that the gas discharge lamp 10 is in the off state. A check is possible, for example, through monitoring the voltage U at the gas discharge lamp 10 that is detected by the voltage sensor 17, which is configured as, for example, an ohmic voltage divider. As controlled by the reversing signal 21 emitted by the ignition detector 19, the reversing switch 22 effects a closing of the switch 25 and a startup of the ignition-clock generator 20 by way of the switching signal 26.

The switch 25 that provides the first partial actuation signal 35 is connected to a DC-voltage source, so the first partial actuation signal 35 is a signal that keeps the first semiconductor switch 12 continuously switched on.

FIG. 2 shows the two actuation signals 38, 42 of the two semiconductor switches 12, 13 as a function of time t. The upper partial image of FIG. 2 shows the first actuation signal 38, and the second, lower partial image of FIG. 2 shows the second actuation signal 42. After the circuit has actuated at time 0, the first actuation signal 38 has an H level that corresponds to a switched-on level of the first semiconductor switch 12. The first partial actuation signal 35 occurs between the time 0 and a time $T_Z$, the assumption being that the gas discharge lamp 10 ignites at time $T_Z$.

Until time $T_z$, the ignition-clock generator 20 provides the second partial actuation signal 40. The second partial actuation signal 40 includes signal components having the ignition-clock period $T_R$, which should at least approximately correspond to the period of the resonant frequency of the resonant circuit L1, C1. The second partial actuation signal 40 conducted further by the second OR link 41 switches the second semiconductor switch 13 on and off within the ignition-clock period $T_R$. The ratio of on period to off period depends on the voltage made available by the voltage source 14, the inductance of the second coil L2 and especially the values of the components of the resonant circuit L1, C1. In one embodiment, the on time was set at three-fourths, and the off time at one-fourth, of the ignition-clock period $T_R$.

During the on time of the second semiconductor switch 13, the current flowing through the second coil L2 to ground 11 increases. After the second semiconductor switch 13 has been switched off, the current flowing through the second coil L2, which now can no longer flow through the second semiconductor switch 13, commutates into the first coil L1 of the resonant circuit L1, C1, which is excited to oscillate at its resonant frequency. After the second semiconductor switch 13 has been switched on again, both the increasing current flowing through the second coil L2 and the oscillating-circuit current of the resonant circuit L1, C1 flow through the second semiconductor switch 13.

In principle, it is possible to switch the second semiconductor switch 13 on again after the ignition-clock period $T_R$, independently of influential variables. The switch is preferably not switched on until the current zero-crossing detector 32 has determined that the current flowing in the resonant circuit L1, C1 and detected by the current sensor 33 has become zero. This measure ensures that, on the one hand, the ignition-clock period $T_R$ corresponds to the resonant frequency of the resonant circuit L1, C1 and, on the other hand, the switching losses in the second semiconductor switch 13 are minimized.

Another option of matching the ignition-clock generator 20 to the resonant frequency of the resonant circuit L1, C1 is possible with the frequency modulator 20a, which ensures, for example, that the ignition-clock period of the second partial actuation signal 40 is changed either continuously or in discrete stages for attaining the resonant frequency. An advantageous modification provides that the frequency modulator 20a is controlled as a function of the voltage signal 18. Through checking whether the voltage U increases or decreases at the gas discharge lamp 10, the frequency modulator 20a can raise or lower the frequency and thus attain the resonant frequency.

Should the gas discharge lamp 10 not yet have ignited following a few ignition-clock periods $T_R$, in accordance with an advantageous modification, the presetting of a signal pause in the second partial actuation signal 40 can be provided. The signal pause, during which the second semiconductor switch 13 is off, prevents an overload of the components L1, C1 of the resonant circuit and of the semiconductor switches 12, 13. In particular, an excessive thermal stress of the first capacitor C1 is avoided. This modification includes the ignition-packet clock generator 27, which permits periodic switching of the second semiconductor switch 13 with the ignition-clock period $T_R$ during an ignition-packet period $T_{P1}$, and blocks afterward for a predetermined ignition-packet pause $T_{P2}$.

A modification provides the use of the counter 24, which counts the output of ignition-pulse packets effected by way of the output signal 28 of the ignition-packet clock generator 27. With each increase in the counter state, the ignition-clock period $T_R$ can be changed by means of the frequency modulator 20a. If need be, the voltage signal 18 which, in addition to the counter signal, acts on the frequency modulator 20a, can provide support, in which case it can at least be determined whether the frequency is to be raised or lowered when the counter state increases.

After the gas discharge lamp 10 has been ignited, which is detected by the ignition detector 19, the reversing switch 22 switches off the ignition-clock generator 20 by way of the switching signal 26, and opens the switch 25. At the same time, the operation-clock generator 23 is activated, and provides the second partial actuation signal 36 for the first semiconductor switch 12 and the first partial actuation signal 39 for the second semiconductor switch 13. The operation-clock generator 23 generates signals after the time $T_Z$ shown in FIG. 2, which corresponds to the ignition time $T_Z$ of the gas discharge lamp 10. In the illustrated embodiment according to FIG. 2, it is assumed that the first semiconductor switch 12 is to remain on after the ignition time $T_Z$, while the second semiconductor switch 13 is switched off. After the ignition time $T_Z$, the two semiconductor switches 12, 13 are alternatingly switched on and off, in push-pull operation, with a predetermined operation-clock period $T_B$. The operating frequency is selected to be lower in comparison to the resonant frequency of the resonant circuit L1, C1. With this measure, the inductive properties of the second coil L2 and the first coil L1 become background considerations, so an operation of the gas discharge lamp 10 with a rectangular signal course is possible. Following ignition, the first capacitor C1 is no longer significant.

The voltage provided by the DC/DC converter 14 is made available with the predetermined operation-clock period $T_B$ of the gas discharge lamp 10. The second capacitor C2, which connects the gas discharge lamp 10 to a switching reference point—ground 11 in the illustrated embodiment—ensures the suppression of DC-current components that could occur at least in a unipolar voltage supply.

It is possible to control the electrical power supplied to the gas discharge lamp 10 with a change in the frequency of the operation-clock generator 23, for example, in which instance the power preset 30 preferably sets the power by presetting the current flowing through the gas discharge lamp 10 with a determined lamp voltage U. Therefore, the nominal power value, the voltage signal 18 and a current signal detected by a current sensor that is not shown in detail are advisably provided to the power presetting 30 as input signals 31a . . . 31b, with the current signal representing the current flowing through the gas discharge lamp 10. The power of the gas discharge lamp 10 is preferably set through a variation of the output voltage of the DC/DC converter. The control signal 29 provided by the power presetting 30 is thus made available to the DC/DC converter 14 for varying the output voltage.

Another advantageous embodiment involves the two coils L1, L2, which are preferably at least loosely coupled magnetically by way of the coupling M. This type of loose magnetic coupling can be attained, for example, if the two coils L1, L2 are configured as coupled air-core coils. With this measure, a voltage increase occurs in the resonant circuit C1, L1 that effects an additional voltage increase with simple means. A further advantage results from a reduction in the dimensions of the coupled coils L1, L2 with respect to an arrangement in which the two coils L1, L2 are configured separately.

The resonant frequency of the resonant circuit L1, C1 is preferably in a range of 100 kHz to 10 MHz, while the operating frequency corresponding to the operation-clock period $T_B$ is preferably in a range of 100 kHz to 20 kHz during continuous operation of the gas discharge lamp 10. The capacity value of the first capacitor C1 is preferably in a range of 0.5 pF to 200 pF. The ignition voltage of the gas discharge lamp 10 occurs at the first capacitor C1, so the first capacitor C1 must be correspondingly dimensioned. The first capacitor C1 is preferably already dictated by the electrode capacity of the gas discharge lamp 10, so a separate component as the first capacitor C1 can be omitted. An option of the configuration as a separate component is provided by a high-voltage-resistant coaxial cable that has a predetermined length for attaining the capacity. With the basis of the capacity range of, for example, 0.5 pF to 200 pF, the inductance of the first coil L1 is in a range of, for example, 2 $\mu$H to 20 mH for attaining a value within the above-disclosed resonant-frequency range. The inductance value of the second coil L2 is preferably set at a value of 500 nH to 500 $\mu$H. The ignition-packet period $T_{B1}$ is, for example 100 $\mu$s, followed by the ignition-packet pause $T_{P2}$ of, for example, 1 to 10 ms.

The DC/DC converter 14 that is preferably provided increases the voltage provided by the battery 16 to the voltage level required for operating the gas discharge lamp 10 in continuous operation, for example 50 V to 250 V. The DC/DC converter 14 is particularly provided if the gas discharge lamp 10 is used as a headlight lamp in a motor vehicle, in which case a power regulation via a variation in the output voltage of the DC/DC converter 14 is provided.

What is claimed is:

1. Apparatus for operating a gas discharge lamp, having a resonant circuit that contains the gas discharge lamp, wherein a circuit is provided that is connected across a voltage source (14) and includes a first semiconductor switch (12) connected between one pole of the voltage source and one terminal of a first inductive element (L2), and a second semiconductor switch (13) connected between a second terminal of the first inductance and an opposite pole of the voltage source; and the resonant circuit (L1, C1) is connected at a connecting point (15) between the first inductive element (L2) and the second semiconductor switch (13).

2. Apparatus according to claim 1, wherein the resonant circuit (L1, C1) is configured as a series connection comprising a second inductive element (L1) and a first capacitor (C1) that is connected in parallel to the gas discharge lamp (10).

3. Apparatus according to claim 1, wherein the gas discharge lamp (10) is connected by a second capacitor (C2) to a point of reference potential.

4. Apparatus according to claim 1, wherein an ignition detector (19) is provided that detects the ignition of the gas discharge lamp (10).

5. Apparatus according to claim 4, wherein the ignition detector (19) evaluates the voltage (U) occurring at the gas discharge lamp (10).

6. Apparatus according to claim 4, wherein an ignition-clock generator (20) is provided that is influenced by the ignition detector (4) and acts upon the second semiconductor switch (13) with a partial actuation signal (40) whose period ($T_R$) at least approximately corresponds to the resonant frequency of the resonant circuit (L1, C1).

7. Apparatus according to claim 6, wherein the on period of the second semiconductor switch (13) within the period ($T_R$) is longer than the off period.

8. Apparatus according to claim 6, wherein a frequency modulator (20a) is provided that influences the period of the partial actuation signal (40).

9. Apparatus according to claim 8, wherein the frequency modulator (20a) influences the period ($T_R$) as a function of the voltage (U) occurring at the gas discharge lamp (10).

10. Apparatus according to claim 6, wherein an ignition-packet clock generator (27) is provided that controls the emission of the partial actuation signal (40) such that an ignition-packet period ($T_{P1}$) is provided, during which the second semiconductor switch (13) is alternatingly switched on and off, followed by an ignition-packet pause ($T_{P2}$).

11. Apparatus according to claim 10, wherein the number of ignition pulse packets is detected by a counter (24) that influences the period ($T_R$).

12. Apparatus according to claim 4, wherein a current sensor (33) is provided for detecting the current flowing in the resonant circuit (L1, C1), and the ignition-clock generator (20) is influenced as a function of the detected current signal (34).

13. Apparatus according to claim 12, wherein the second semiconductor switch (13) is switched on after a current zero crossing is detected.

14. Apparatus according to claim 4, wherein an operation-clock generator (23) is provided that is influenced by the ignition detector (19) and effects alternating switching, in push-pull operation, of the two semiconductor switches (12, 13) following ignition of the gas discharge lamp (10).

15. Apparatus according to claim 14, wherein the operation-clock period ($T_B$) that is predetermined by the operation-clock generator (23) is longer than the period of the resonant circuit (L1, C1).

16. Apparatus according to claim 1, wherein the voltage source (14) is a DC/DC converter that is fed by a battery (16).

17. Apparatus according to claim 16, wherein the DC/DC converter (14) provides an output voltage as a function of a control signal (29) that is provided by a power presetting (30).

18. Apparatus according to claim 1, the wherein first inductive element (L2) and the second inductive element (L1) included in the resonant circuit (L1, C1) are magnetically coupled.

19. Apparatus according to claim 18, wherein the two inductive elements (L1, L2) are loosely magnetically coupled.

20. Method for operating a gas discharge lamp contained in a resonant circuit, comprising: providing a series connection that is connected to a voltage source (14) and includes a first semiconductor switch (12), an inductive element (L2) and a second semiconductor switch (13), with the resonant circuit (L1, C1) being connected at a connecting point (15) between the inductive element (L2) and the second semiconductor switch (13), further providing an ignition detector (19) that permits a distinction between the ignited and non-ignited states of the gas discharge lamp (10), switching on the first semiconductor switch (12) during the non-ignited state of the gas discharge lamp (10), and at least intermittently ($T_{P1}$) switching the second semiconductor switch (13) to excite the resonant circuit (L1, C1), and following ignition of the gas discharge lamp (10), alternatingly switching the two semiconductor switches (12, 13) in push-pull operation with a predetermined operation-clock period ($T_B$) for operating the gas discharge lamp (10) in continuous operation.

* * * * *